United States Patent
Moran et al.

(10) Patent No.: US 7,864,347 B2
(45) Date of Patent: Jan. 4, 2011

(54) SYSTEMS AND METHODS THAT PROVIDE CUSTOM REGION SCAN WITH PREVIEW IMAGE ON A MULTIFUNCTION DEVICE

(75) Inventors: Jared Walton Moran, Rochester, NY (US); Roger W. Budnik, Rochester, NY (US); Dave R. Campbell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1068 days.

(21) Appl. No.: 11/166,267

(22) Filed: Jun. 27, 2005

(65) Prior Publication Data

US 2006/0291017 A1    Dec. 28, 2006

(51) Int. Cl.
H04N 1/46    (2006.01)

(52) U.S. Cl. ............ 358/1.13; 358/1.18; 358/538; 358/537

(58) Field of Classification Search ........... 358/538, 358/537, 1.2, 1.15, 402, 1.13, 453, 474
See application file for complete search history.

(56) References Cited

U.S. PATENT DOCUMENTS

| 5,144,452 | A |   | 9/1992 | Abuyama |   |
|---|---|---|---|---|---|
| 5,191,429 | A |   | 3/1993 | Rourke |   |
| 5,467,202 | A | * | 11/1995 | Washio et al. | 358/448 |
| 5,920,405 | A |   | 7/1999 | McIntyre et al. |   |
| 5,950,045 | A | * | 9/1999 | Nomura et al. | 399/81 |
| 6,151,426 | A |   | 11/2000 | Lee et al. |   |
| 6,281,983 | B1 | * | 8/2001 | Takahashi et al. | 358/1.2 |
| 6,330,085 | B1 | * | 12/2001 | Yamamoto et al. | 358/538 |
| 6,741,270 | B1 |   | 5/2004 | Rzepkowski et al. |   |
| 2002/0156834 | A1 | * | 10/2002 | Kitada et al. | 709/203 |
| 2003/0043399 | A1 | * | 3/2003 | Johnston et al. | 358/1.13 |
| 2003/0053160 | A1 | * | 3/2003 | Cheng | 358/527 |
| 2003/0101237 | A1 | * | 5/2003 | Ban et al. | 709/218 |
| 2003/0156197 | A1 | * | 8/2003 | Watanabe et al. | 348/207.2 |
| 2004/0036914 | A1 | * | 2/2004 | Kropf et al. | 358/1.18 |
| 2004/0095317 | A1 | * | 5/2004 | Zhang et al. | 345/158 |
| 2005/0105129 | A1 | * | 5/2005 | Takahashi | 358/1.15 |
| 2005/0168763 | A1 | * | 8/2005 | Higuchi et al. | 358/1.13 |
| 2005/0213174 | A1 | * | 9/2005 | Maki et al. | 358/540 |

FOREIGN PATENT DOCUMENTS

JP    2003107963 A  *  4/2003

* cited by examiner

Primary Examiner—King Y Poon
Assistant Examiner—Allen H Nguyen
(74) Attorney, Agent, or Firm—Oliff & Berridge, PLC

(57) ABSTRACT

A multifunction device having a user interface that enables the selection of a particular region of a document image after an initial scan of a document that creates a preview (thumbnail) image of the document. Using a display on the multifunction device, a desired region of the image may be selected for to manipulating and final scanning. A selection box is displayed over the preview image to show the user the region that will be scanned. The user can then select an area of the image for further manipulation through the user interface by moving and/or resizing the selection box, zooming in/out, or erasing a region within the selection box.

17 Claims, 9 Drawing Sheets

SYSTEMS AND METHODS THAT PROVIDE CUSTOM REGION SCAN WITH PREVIEW IMAGE ON A MULTIFUNCTION DEVICE

BACKGROUND

The subject matter of this disclosure relates to multifunctional document processing systems that enable selecting a particular region of a scanned page to be manipulated as desired, and particularly document processing systems that enable such manipulation through a user interface located on a multifunctional device, as opposed to software on a desktop computer.

Multifunction devices offer combined facsimile and/or digital scanning, copying, and printing in a single unit. Current multifunction devices are directly connected to a personal computer or workstation for scanning, copying, and printing to provide printing and to a telephone access line to provide facsimile transmission and receipt.

A multifunction device may be a scanner and a printer that have been integrated into a single unit. An important function of the multifunction device is the scanner. All of the available operations on a multifunction device rely on the image that is scanned into memory. For example, before a document can be faxed, copied or printed, a scanning operation must first occur so that the image can then be manipulated according to the selected function.

The scanning process is generally controlled by a software utility called a TWAIN driver. The TWAIN driver is used to set the scan quality and area of the scan function, as well as used to set paper type, size and image quality in the printer function. The driver can be accessed from within any software that supports TWAIN.

However, due to size and space constraints of multifunction devices, memory limitations, cost limitations, and the like, multifunction devices have weaknesses when compared to separate stand alone devices. For example, due to memory limitations, performance in scanning is often limited. One solution has been to utilize the performance characteristics of the attached personal computer or workstation to enhance the performance of the multifunction device. However, the necessity of relying on the personal computer or workstation significantly hampers the utility and mobility of multifunction devices.

SUMMARY

The subject matter of this disclosure provides a multifunctional device having the performance characteristics of a stand alone device without the necessity of relying on an attached personal computer or workstation. In various exemplary embodiments, the scanning process may be effectuated through a user interface, e.g., a graphic user interface (GUI) located on the multifunction device as opposed to an interface on a personal computer or workstation.

An aspect of the scanning process that may be effectuated at the user interface is the selection of a particular region of an image using the user interface. After an initial scan of an object, a preview (thumbnail) image of the object is shown on a display of the multifunction device where the user may select a desired region of the image to scan and manipulate. A selection box is displayed over the preview image to show the user the region that will be scanned. The user can then select an area of the image for further manipulation through the user interface by moving and/or resizing the selection box, zooming in/out, or erasing a region within the selection box.

In various exemplary embodiments, the TWAIN driver and/or other machine executable instructions necessary for controlling a desired function of the multifunction device is resident in the multifunction device, rather than the personal computer or workstation.

DETAILED DESCRIPTION OF EMBODIMENTS

The subject matter of this disclosure provides various systems and methods for selecting specific scan regions on a multifunction device, using a "preview scan" image of a document and displaying a "thumbnail" image of the scanned document. A resizable and movable selection box may be used to select a desired area to be manipulated before a final scan is executed. The selected and/or otherwise manipulated selected scan area can then be printed, copied, e-mailed or faxed using the available functions of the multifunction device.

Figure 1:
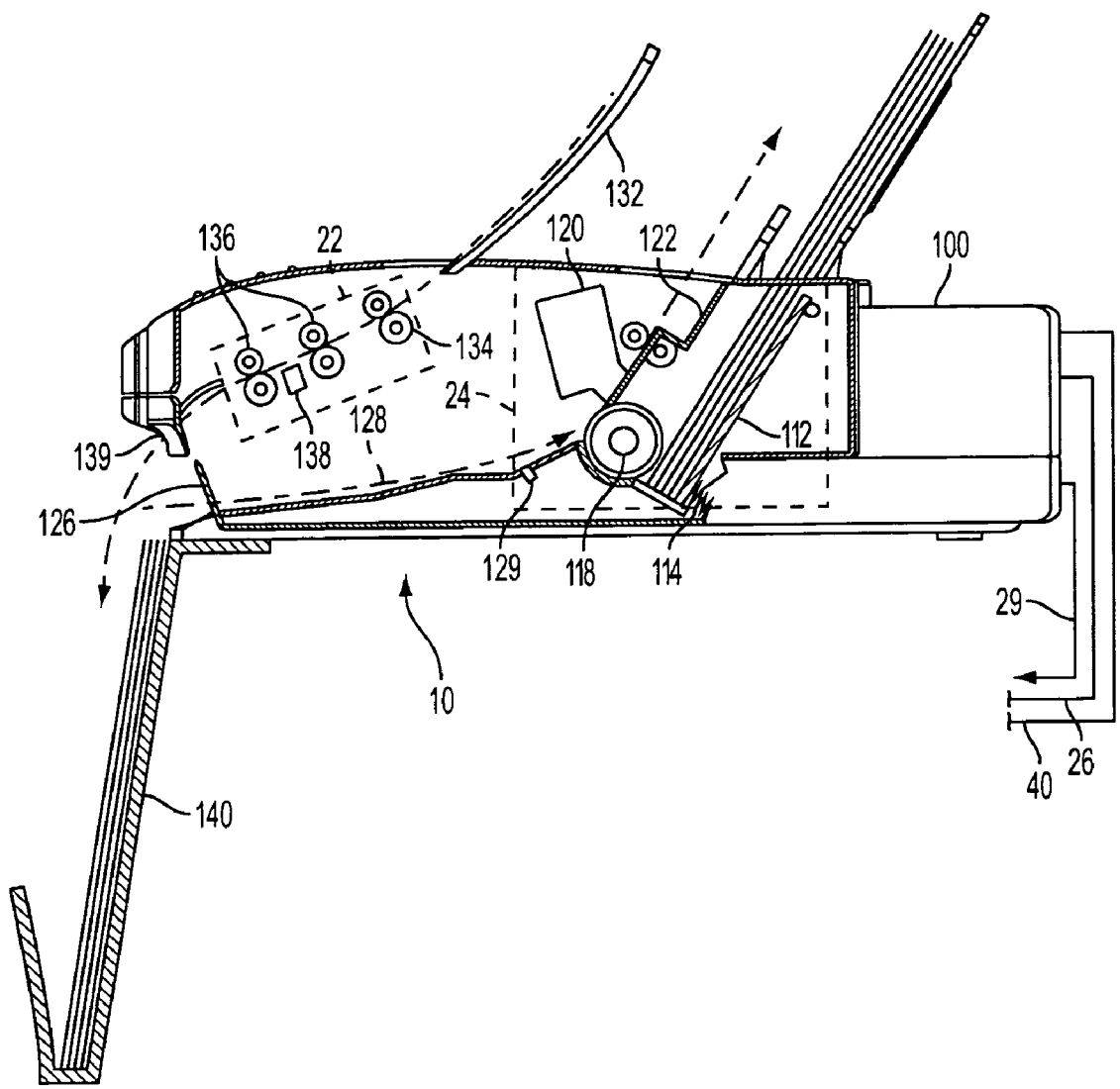
FIG. 1 is an exemplary schematic view of a multifunction device in which the subject matter of this disclosure may be implemented.

FIG. 1 is a schematic view of an exemplary multifunction device in which the subject matter of this disclosure may be implemented. As shown in FIG. 1, a multifunction device 10 has a housing 100 that houses at least a scanner portion 22, a printer portion 24, and a facsimile/e-mail portion 40, 42, paper transports and appropriate connections to external functions.

The printer portion 24 of the multifunction device 10 may include, for example, an input paper tray 112, with an appropriate tray elevator 114. In operation, sheets of paper are fed from the paper tray 112 by a roll feeding arrangement 118, which advances the sheets from the paper tray 112 for printing as the sheet is wrapped past the feed roller arrangement 118. In an exemplary embodiment, the printer portion 24 may include an ink jet printing system 120 that deposits ink in image configuration. Upon completion of printing, the printed sheets continue to advance until they are deposited in output tray 122.

For printing on stock which is not suitable for stacking in the input paper tray 112, a bypass path is provided to allow such stock to enter the multifunction device 10 at a bypass entry 126. Upon entry, the stock travels along a sheet path 128 that is defined by paper guides (not shown). In this embodiment, the print stock is manually inserted at the bypass entry 126 until the stock engages the feed roller arrangement 118 whereby the stock is transported along the sheet path 128. A sensor 129, senses the presence of the bypass stock and signals a controller 14 (FIG. 2) to start operation of the feed roller arrangement 118 for advancing the print stock past the printer portion 24.

Although the exemplary multifunction device 10 is described as having an ink jet printer, the subject matter of this disclosure may be used with multifunction devices having other types of printers.

The scanner portion 22 may include an input document tray 132, with a retard feeder 134, for inputting objects, e.g., feeding documents seriatim from the input tray 132. The documents are advanced to a CVT arrangement 136, where the documents will pass a full width scanning element, with appropriate illumination and optics, indicated generally by 138. The scanned documents are directed to an exit 139, from which they are gravity stacked in an output document tray 140.

Figure 2A:
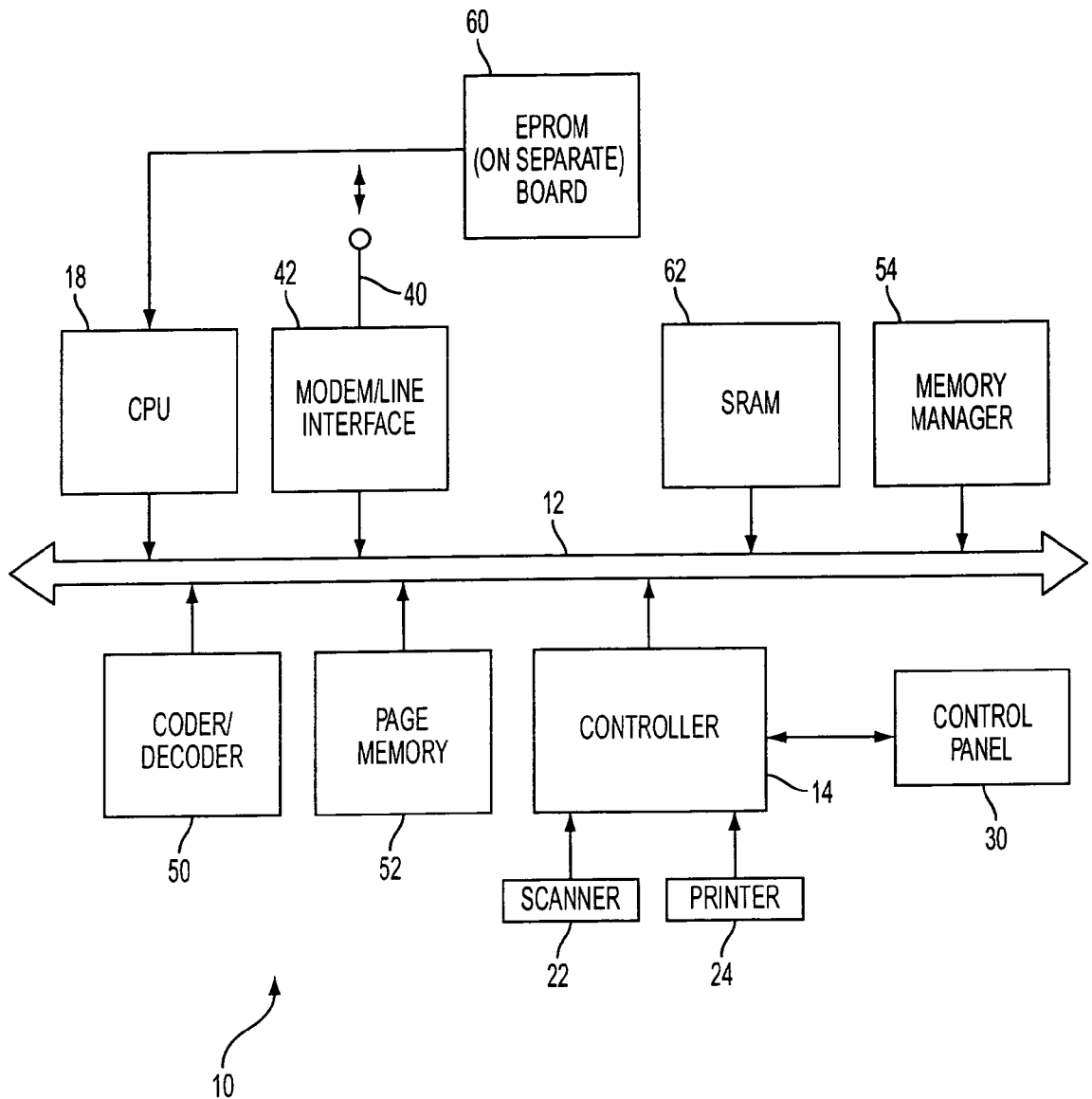
FIGS. 2A and 2B are exemplary block diagrams of multifunction devices in which the subject matter of this disclosure may be implemented.

FIG. 2A is an exemplary block diagram of a bus arrangement for a stand alone multifunction device in which the subject matter of this disclosure may be implemented. As shown in FIG. 2A, the bus arrangement for the stand alone multifunctional document processing system 10 may include a system bus 12 that facilitates communication between the various components of the multifunction device/system 10.

In this exemplary embodiment, device control is implemented by a programmable controller 14. A central processing unit (CPU) 18 may include a second programmable controller which serves to provide control of overall stand alone multifunction system processing. The scanner portion 22 and the printer portion 24 are connected to the multifunction system 10 via the CPU 18. The printer portion 24 generates any required hard copy. In an embodiment, the printer portion may be an ink jet, or other type, printer. The scanner portion 22 is included to provide full facsimile and/or copier functions.

The controller 14 additionally provides control for a user interface/control panel (UI) 30 for the multifunction system 10. The controller 14 also receives the outputs of the multifunction systems machine sensors, and provides control of the mechanical components of the system, and particularly the paper transport systems 18, 134, 136. It should be appreciated that a network connection or network server could be implemented in such a multifunction system 10 to interface with network operation.

Facsimile/e-mail communication is provided for the multifunction system 10 via a telephone line 40 and a fax/e-mail modem 42. Decoding and encoding of facsimile/e-mail transmissions is provided by coder/decoder 50. A page memory 52 is provided, having storage capability for storing electronic document signals corresponding to at least several pages of received data. Access to the memory 52 is controlled by memory manager 54, which in turn is controlled by CPU 18.

The memory 52 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like. EPROM of 60 and SRAM may be implemented using any similar appropriate combination of alterable, volatile or non-volatile memory or non-alterable, or fixed, memory.

In an exemplary embodiment of the multifunction system 10, the CPU 18 is used to control access to the data bus 12, on which image information and control information flow is provided. In such an arrangement, a facsimile transmission can be received by the multifunction system 10 at the telephone line 40 and the fax/e-mail modem 42, and directed either directly to the printer portion 24, via the controller 14, or to the page memory 52. Information stored at the page memory 52 can be directed to the printer portion 24. Scanned data from the scanner portion 22 can be directed via the controller 14 either to the page memory 52 (which is particularly useful in the case of pre-collation) or to the printer portion 24.

Figure 2B:
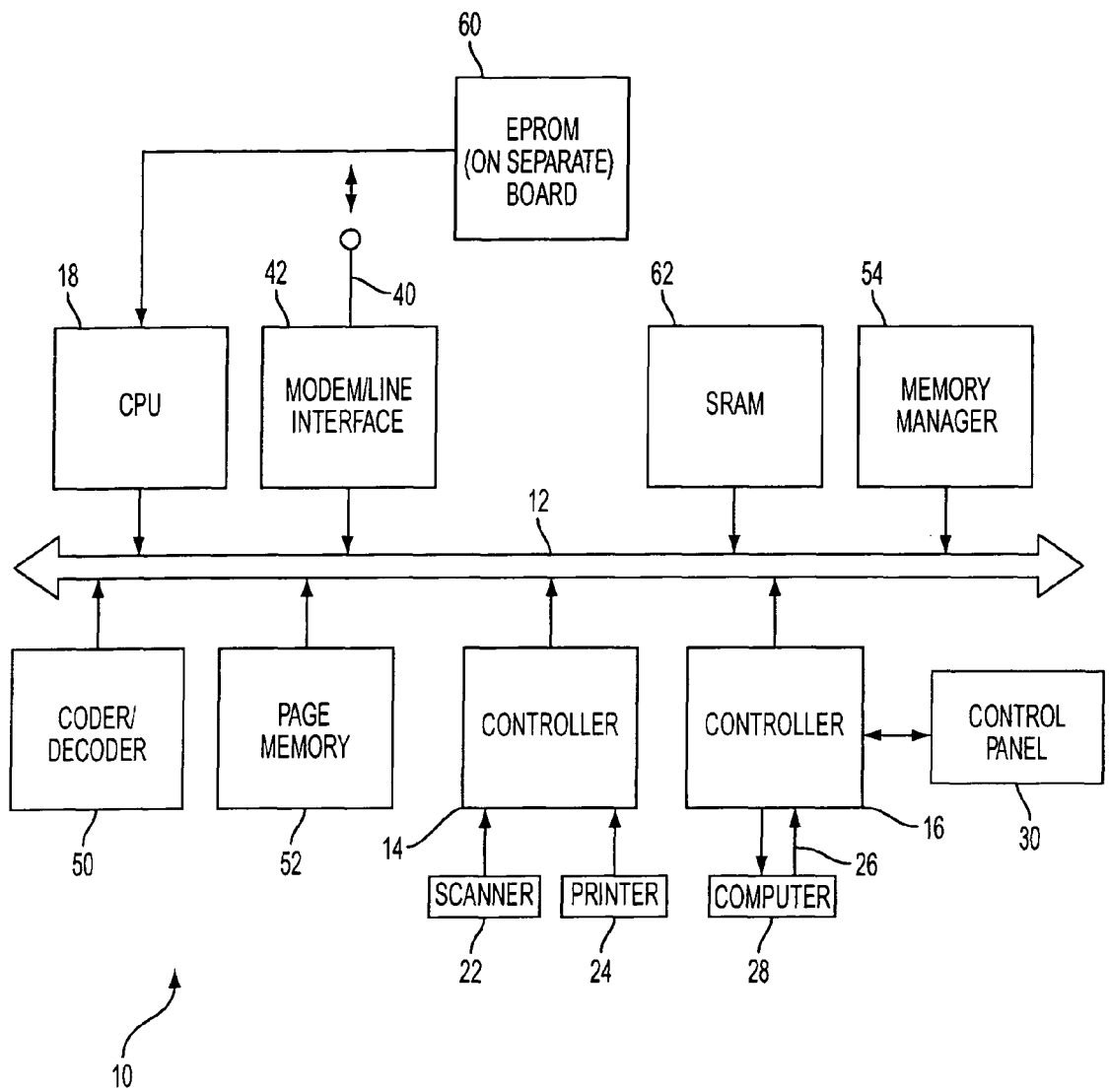

Although the subject matter of this disclosure may be implemented on a stand alone device, as described above, the subject matter of this disclosure may also be implemented on a multifunction device described in FIG. 2B.

FIG. 2B is an exemplary block diagram of another bus arrangement for a multifunction system in which the subject matter of this disclosure may be implemented. As shown in FIG. 2B, the multifunctional document processing system 10*a* may include a system bus 12 that provides for communication between the various components of the device/system 10*a*. In this exemplary embodiment, device control is distributed between two programmable controllers, hereinafter first controller 14 and second controller 16. A central processing unit (CPU) 18 may include a third programmable controller which serves to provide control of overall system processing. The scanner portion 22 and the printer portion 24 are connected to the system 10*a* via the CPU 18. The printer portion 24 generates any required hard copy. In an embodiment, the printer portion 24 may be an ink jet, or other type, printer. The scanner portion 22 is included to provide full facsimile and/or copier functions.

The multifunction system 10*a* is operative to process electronic document signals directed thereto via the second controller 16 by a serial, parallel or SCSI connection 26 from an external personal computer or workstation 28. The second controller 16 may support an additional outward connection 29 from the system to the personal computer 28 for passing scanned data thereto. The second controller 16 additionally provides control for a user interface/control panel (UI) 30 for the system 10*a*. The second controller 16 also receives the outputs of the systems machine sensors, and provides control of the mechanical components of the system, and particularly the paper transport systems 18, 134, 136. It should be appreciated that instead of a personal computer 28, a network connection or network server could be substituted, to provide network operation.

Facsimile/e-mail communication is provided for the multifunction system 10*a* via a telephone line 40 and a fax/e-mail modem 42. Decoding and encoding of facsimile/e-mail transmissions is provided by coder/decoder 50. A page memory 52 is provided, having storage capability for storing electronic document signals corresponding to at least several pages of received data. Access to the memory 52 is controlled by memory manager 54, which in turn is controlled by CPU 18.

The memory 52 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In an exemplary embodiment of the multifunction system 10a, the CPU 18 is used to control access to the data bus 12, on which image information and control information flow is provided. In such an arrangement, a facsimile transmission can be received by the document process system 10a at the telephone line 40 and the fax/e-mail modem 42, and directed either directly to the printer portion 24, via the first controller 14, or to the page memory 52. Information stored at the page memory 52 can be directed to the printer portion 24. Information from the computer 28 can be directed via a connection 26 to the second controller 16 to either the page memory 52 or the printer portion 24. Scanned data from the scanner portion 22 can be directed via the first controller 14 either to the page memory 52 (which is particularly useful in the case of pre-collation) or to the printer portion 24.

Figure 3:
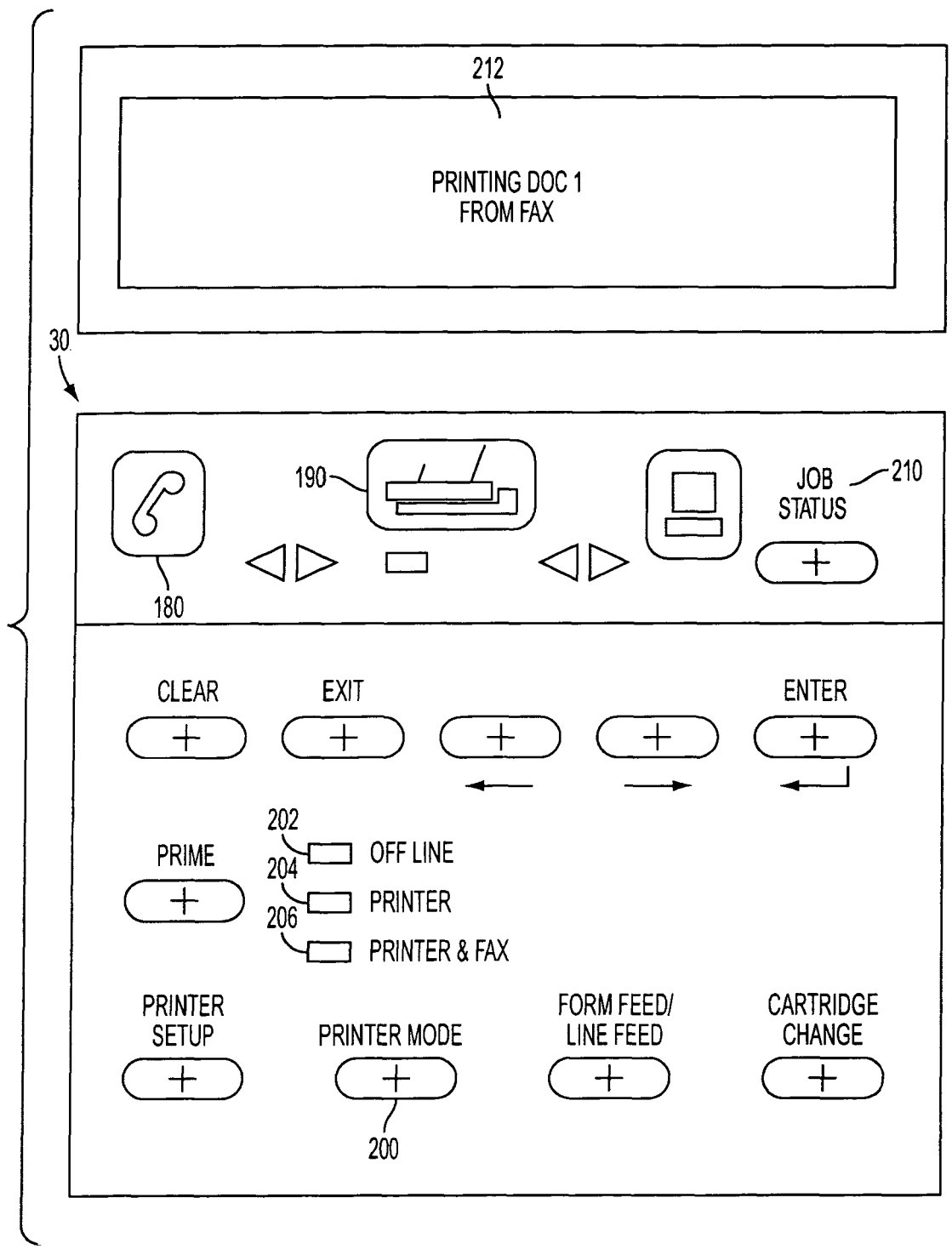
FIG. 3 illustrates an exemplary user interface of a multifunction device.

FIG. 3 illustrates an exemplary embodiment of a portion of a user interface of a multifunction device. As shown in FIG. 3, a portion of the user interface 30 may include a Print Mode button 200, used as a switching arrangement which toggles the condition of the Print Mode Selection between three conditions: Off Line, Printer, or Printer & Fax. The condition selected is displayed by LED's 202, 204, 206 having adjacent labels indicating the condition to be selected, with an ON state of the LED indicating the selected condition. A Job Status button 210 causes the CPU 18 to direct a brief description and status of any job in the system to be displayed on an LED or LCD alphanumeric display 212. A fax button 180 and a scan/copy button 190 allow a user to select a desired function of the multi function device 10.

Figure 4:
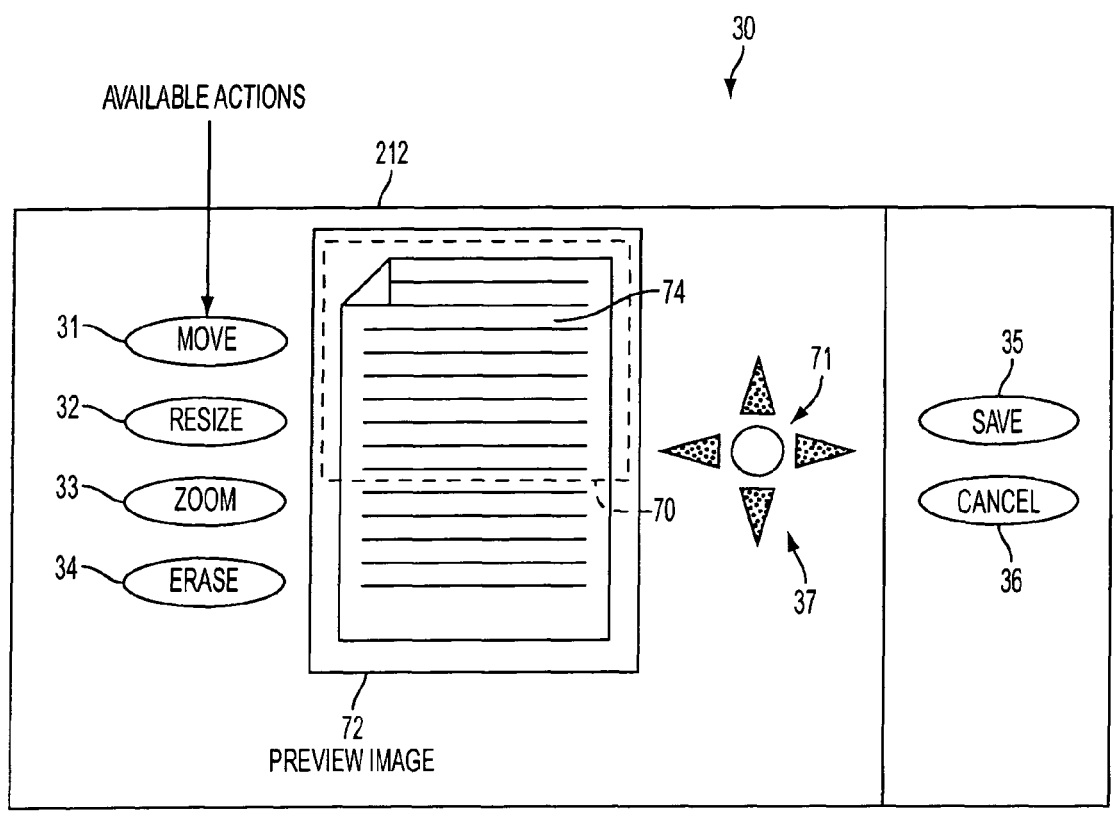
FIG. 4 is a view of exemplary features of the user interface including a preview image and a selection box.

FIG. 4 is an exemplary view of detailed features that may be used with the user interface including a preview image portion and a selection box portion. As shown in FIG. 4, a custom scan menu may be accessed by the user interface 30 for display on the LED or LCD alphanumeric display 212. In an exemplary embodiment, the user interface 30 may be a touch screen, e.g. a kiosk, such as shown in FIG. 4. It will be appreciated that other user interface types, such as a keypad, mouse, light pen, and the like, are contemplated.

Upon executing a preview scan, for example, by activating the scanning portion 22 through the scan/copy button 190, a thumbnail or preview image 72 of the scanned document is displayed on the display 212. An adjustable selection box 70 is displayed over the preview image 72. The user interface 30 may include selection buttons or keys 31-34 that allow the user to manipulate the selection box 70 to control selection of a desired portion of the thumbnail image 72 to be scanned and/or further manipulated. For example, the move button 31 activates execution of control of the location of the selection box 70 over the image 72. The resize button 32, activates execution of altering the dimensions of the selection box 70. The zoom button 33 activates execution of magnification of the area 74 within the selection box 70. The erase button 34 activates execution of erasing or removing the area 74 within the selection box 70.

Activation of the move button 31 enables arrow keys 37 to provide directional control of the selection box 70 over the image 72. In an exemplary embodiment, the arrow keys 37 are positioned on a North, South, East, West orientation to control movement of the selection box 70 in an up, down, right, left direction, respectively. In an embodiment, a center key or button 71 may be provided among the arrow keys to "toggle" among the arrow keys 37 to selectively activate a desired arrow key. Once the selection box 70 is positioned at a desired placement, the position of the selection box 70 and the image area 74 within the selection box may be saved by selecting the save button 35. Alternatively, the user may exit out of the custom scan window by depressing the cancel button 36.

Although controlling the movement of the selection box 70 is described using the arrow keys 37, other types of control devices, such as a keypad, mouse, or the like, are also contemplated.

Figure 5A:
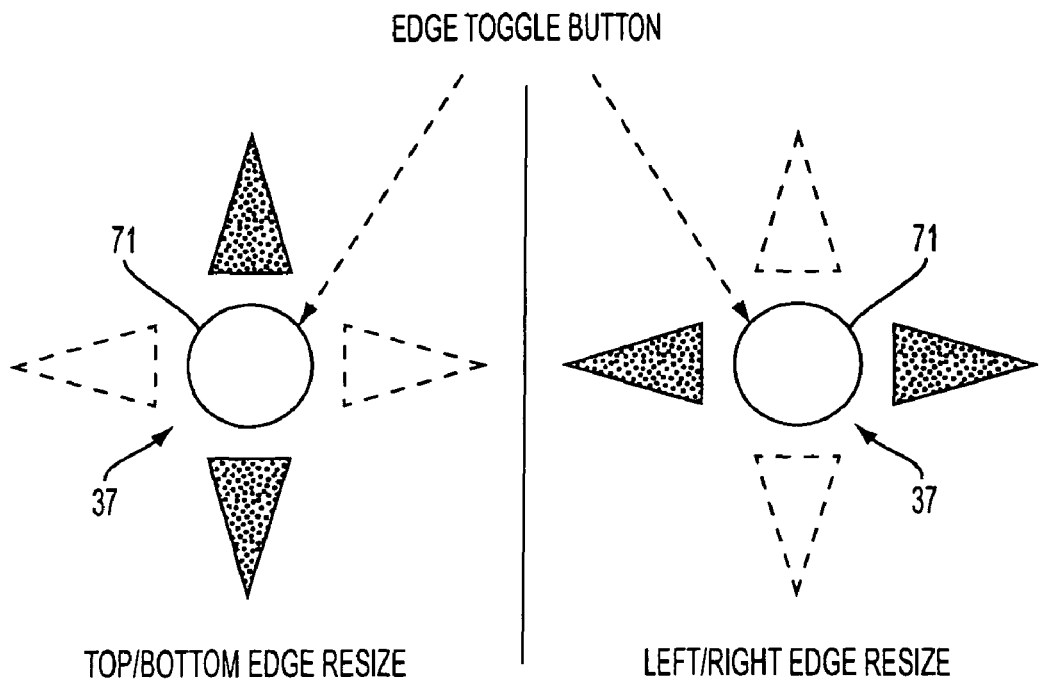
FIGS. 5A and 5B show exemplary features of the user interface including a scan box and a resize function.
Figure 5B:
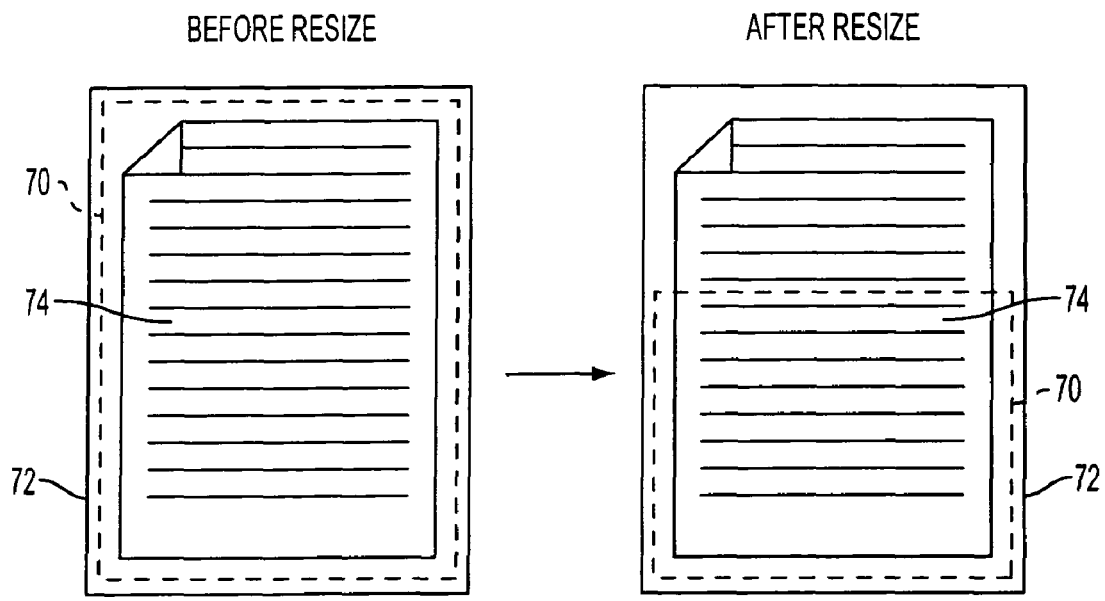

FIGS. 5A-5B show an exemplary detailed diagram of the user interface including the scan box and resize function. As shown in FIG. 5B, while in the custom scan window, the user may resize the selection box 70. To resize the selection box 70, the resize button 32 is depressed to activate execution of the resize function. The resize function allows the user to change the size of the selection box 70 by moving the edges of the selection box 70 in a desired direction. In an exemplary embodiment, each of the edges may be moved individually by activating the appropriate arrow key so as to move a side of the box 70. In an alternative embodiment, all of the boundary edges of the selection box 70 may be moved together to make the selection box 70 proportionally larger or smaller by "dragging" any of the boundary edges in a desired direction.

By using the center key 71, the user can toggle between the four edges of the selection box 71, i.e., top edge, bottom edge, left edge, right edge. Depending on which edge is selected, the correct arrow key 37 is activated and the other arrow keys 37 are inactive. The inactive keys are shown by the dashed lines in FIG. 5A. In an alternative exemplary embodiment as shown in FIG. 5A, the arrow keys may be activated in pairs to simultaneously activate the left/right arrow keys or the up/down arrow keys.

FIG. 5B shows an exemplary embodiment of a resized selection box 70. As shown in FIG. 5B, the thumbnail image on the left is shown with a "before resize" selection box 70 laid over the image 72 as the selection box 70 may appear before a desired image area has been selected. The thumbnail image 72 on the right shows the selection box 70a after resizing the box 70b by selecting the top edge of the image using the center key 71 to toggle to the top edge and using the center key 71 to activate the up/down arrow keys to move the top edge of the selection box 70 downwardly. As shown in the "after resize" image, the top edge of the selection box 70a is lower than the top edge of the selection box 70b shown in the "before resize" image, resulting in a smaller, customized scan region 74.

Figure 6A:
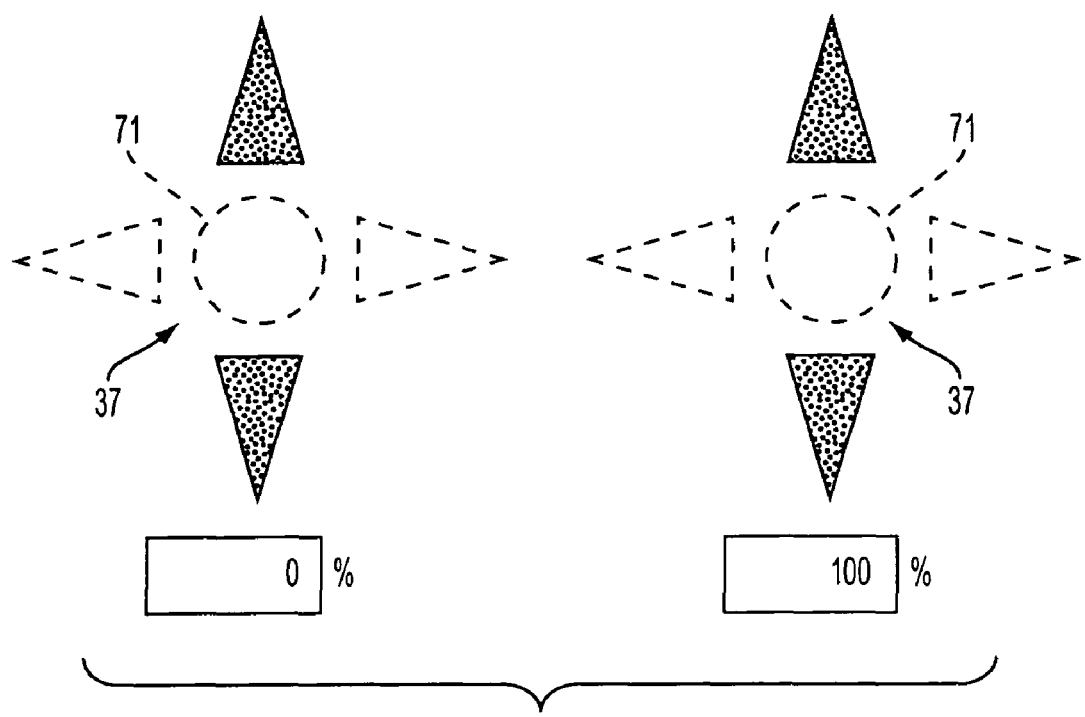
FIGS. 6A and 6B show exemplary features of the user interface including a scan box and a zoom function.
Figure 6B:
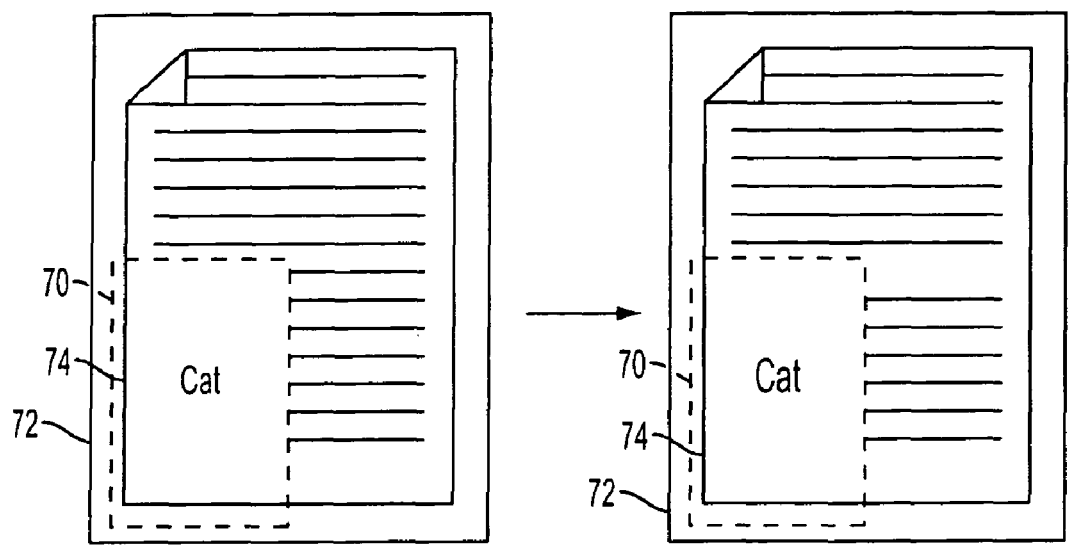

FIG. 6 is an exemplary view of detailed features of the user interface including the scan box and zoom function. As shown in FIG. 6, upon activating the zoom function by depressing the zoom key 33, the up/down arrow keys 37 may be used to increase or decrease the magnification of the image area 74 within the box 70. In an exemplary embodiment, the up arrow key may be used to increase the magnification area inside the selection box 70. If a user wishes to decrease magnification, the center key 71 may be used to activate the down arrow key. The down arrow key may be used to incrementally decrease the magnification of the area 74 inside the selection box 70. In FIG. 6, an area 74 inside the selection box 70 is magnified a desired amount.

Figure 7A:
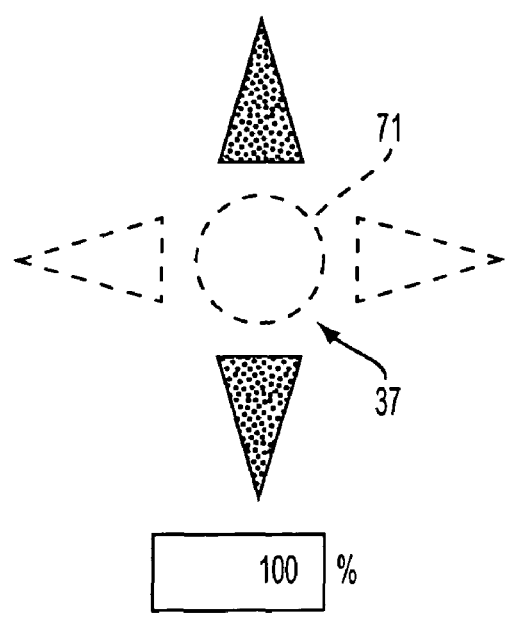
FIGS. 7A and 7B show exemplary features of the user interface including a scan box and an erase function.
Figure 7B:
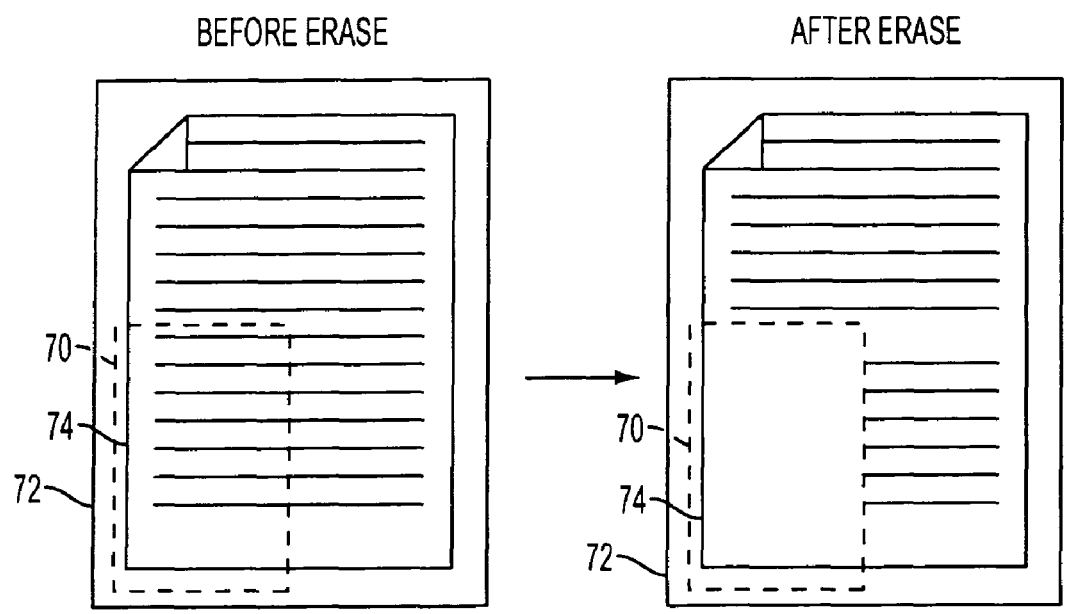

FIG. 7 is an exemplary view of detailed features of the user interface including the scan box and erase function. The erase function may be entered by depressing the erase key 34 on the user interface 30. The erase function allows the user to delete the area 74 of the image within the selection box 70. For example, as shown in FIG. 7, the selection box 70 has been moved and resized to fit the desired area to be erased from the document prior to the final scan. By enabling this feature, the user can remove any unwanted content from the image prior to printing, copying and/or faxing/e-mailing the document.

Figure 8:
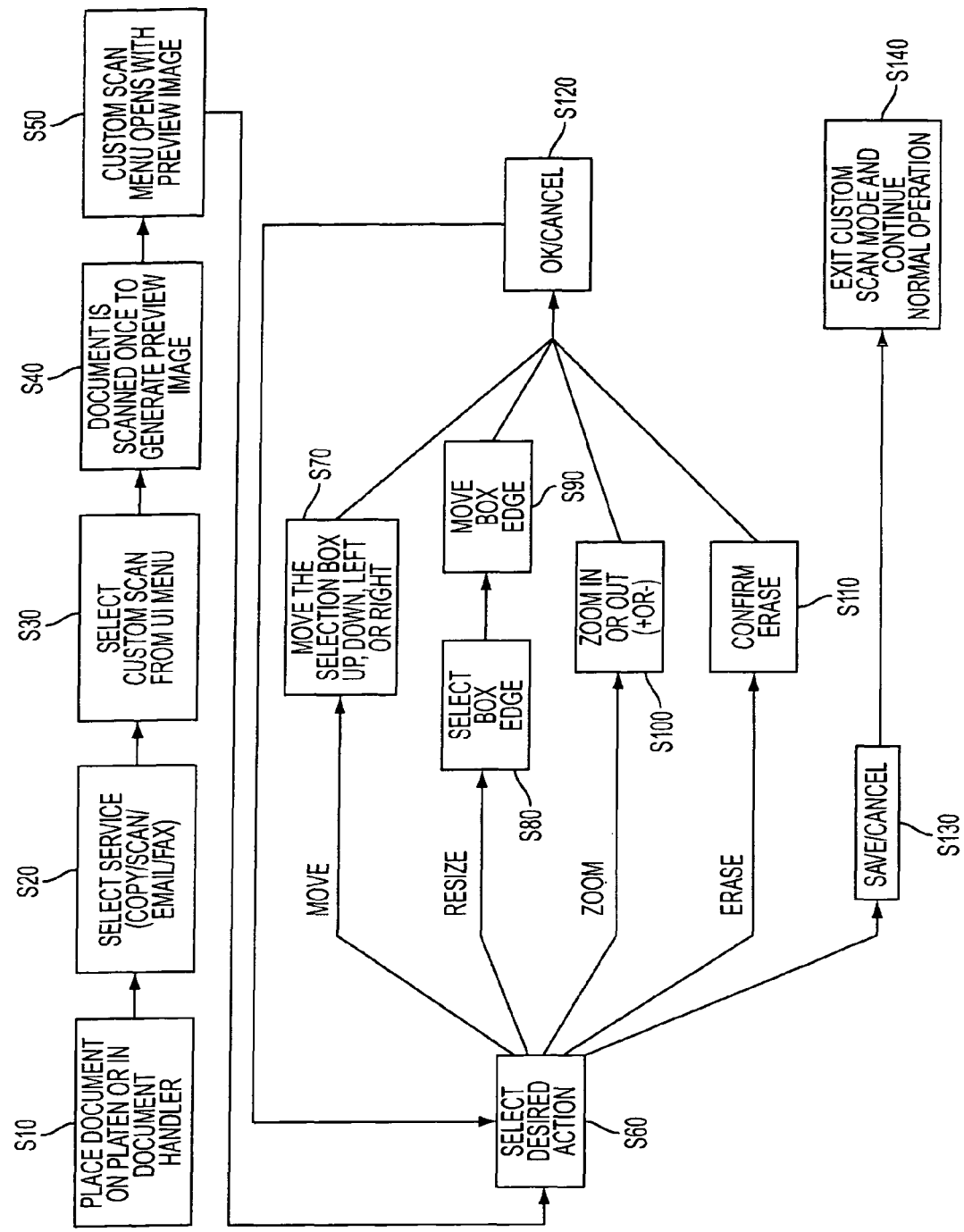
FIG. 8 is a flow diagram of the systems and methods of this disclosure.

FIG. 8 shows an exemplary flow diagram of methods for using the systems of this disclosure. The custom scan feature of the multifunction device, allows a user to select and/or manipulate a particular region of a document while using the multifunction device to scan, fax, copy, print, e-mail, etc.

As shown in FIG. 8, control begins at step S10 when a document is prepared for scanning by a multifunction device. The document may be placed directly on a platen or in a document handler for feeding to the scanner. Control continues at step S20 where a user selects a desired service or function of the multifunction device, such as copying, scanning, faxing, emailing, etc. Control then shifts to step S30 where the user enters the custom scan menu from a user interface. A preview scan is then performed at step S40 to create a preview image of the document. Upon generation of the preview scan, the custom scan menu of the user interface becomes active at step S50 and a selection box appears over the preview image.

Control continues at step S60 where a user may customize the preview image by selecting from a plurality of functions that manipulate the selection box and/or the area within the selection box. At step S70, customization of the preview proceeds by moving the selection box to a desired region of the preview image. Upon moving the selection box to the desired region, control shifts to step S120 whereby a user may accept the change to a position of the selection box. Control may then return to step S60 where another of the plurality of available functions may be selected, or if no further manipulation of the image is desired, control may shift to step S130 where the changes are saved or the operation may be cancelled.

At step S60, control may proceed to step S80 if the user desires to resize the selection box to encompass a particular area of the image. If resizing is selected, control continues to step S90 where the edges of the selection box may be moved to encompass a desired region of the image. Upon resizing the selection box to a desired size, control continues to step S120 whereby the process discussed above is repeated.

At step S60, control may also proceed to step S100 if the user desires to magnify or reduce the area within the selection box. Upon zooming in or zooming out on the area within the selection box to magnify the area as desired, control continues to step S120 whereby the process discussed above is repeated.

At step S60, control may proceed to step S110 if the user desires to erase or delete an area of the image within the selection box. Upon erasing or deleting the area within the selection box, control continues to step S120 whereby the process discussed above is repeated.

Once changes are saved or the operation is cancelled in step S130, control continues to step S140 where the custom scan menu is exited and the service selected at step S20 is performed.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A multifunction device, comprising:
    at least two of a scanning portion, a printing portion, a facsimile portion, and an e-mail portion disposed in a housing;
    a user interface portion and a display portion disposed on a surface of the housing; and
    a controller that controls:
        capturing images of documents using the scanning portion to create a preview image,
        displaying an adjustable selection box that is resizable, as visibly separate from and overlaid over the preview image, wherein the adjustable selection box is moveable over the preview image on the display portion,
        manipulating the selection box via the user interface, wherein the user interface includes an edge toggle button that selects an edge of the adjustable selection box and activates a pair of left and right arrow keys to move the selected edge of the adjustable selection box, or activates a pair of up and down keys to move the selected edge of the adjustable selection box, thereby resizing the adjustable selection box, and
        saving an area of the preview image within the selection box to a memory as a saved image.

2. The multifunction device of claim 1, wherein manipulating the selection box includes at least one of altering a position of the selection box, adjusting a magnification of the area within the selection box, and erasing the area within the selection box.

3. The multifunction device of claim 1, wherein the multifunction device is a stand alone device.

4. The multifunction device of claim 1, wherein the controller further controls forwarding the saved image from the memory to at least one of the printing portion, the facsimile portion, and the e-mailing portion.

5. A non-transitory computer-readable medium containing instructions for manipulating a preview image of a scanned document when the instructions are executed by a processor of a multifunction device, comprising:
    instructions for scanning the document to create the preview image;
    instructions for displaying a selection box over the preview image;
    instructions for altering a position of the selection box to a desired portion of the preview image;
    instructions for resizing the selection box, wherein the selection box is resized by selecting an edge of the selection box by using an edge toggle button in a user interface, and using the edge toggle button to activate a pair of left and right arrow keys to move the selected edge of the adjustable selection box, or activate a pair of up and down keys to move the selected edge of the adjustable selection box, thereby resizing the adjustable selection box;
    instructions for performing an editing function on an area within the selection box;
    instructions for storing an image of the area within the selection box in a memory; and
    instructions for implementing a service of the multifunction device on the image of the area within the selection box.

6. The computer-readable medium as recited in claim 5, wherein the instructions for performing the editing function include at least one of, instructions for altering a magnification of the area within the selection box, erasing the area within the selection box, and instructions for capturing an image of the area within the selection box.

7. The computer-readable medium as recited in claim 5, wherein the instructions for resizing the selection box are implemented via a user interface on a multifunction device.

8. The computer-readable medium as recited in claim 5, wherein the instructions for performing the editing function on the area within the selection box are implemented via a user interface on a multifunction device.

9. A method of selecting a desired portion of a document on a multifunction device, comprising:
   selecting a service provided by the multifunction device;
   scanning the document to create a preview image of the document;
   selecting the desired portion of the preview image by manipulating a selection box that is visibly separate from and overlaid over the preview image, wherein the selection box is resizable and visibly moveable over the preview image;
   resizing the selection box by selecting, an edge of the selection box by using an edge toggle button in a user interface, and using the edge toggle button to activate a pair of left and right arrow keys to move the selected edge of the adjustable selection box, or activate a pair of up and down keys to move the selected edge of the adjustable selection box, thereby resizing the adjustable selection box;
   capturing an area of the preview image within the selection box; and saving the captured area to a memory.

10. The method of claim 9, wherein selecting the service provided by the multifunction device includes at least one of a printing function, a facsimile function, and an e-mailing function.

11. The method of claim 9, wherein selecting the desired portion of the preview image includes repositioning the selection box to encompass the desired portion.

12. The method of claim 9, wherein selecting the desired portion of the preview image includes altering a magnification of the area within the selection box.

13. The method of claim 9, wherein selecting the desired portion of the preview image includes deleting the area within the selection box.

14. The method of claim 9, further comprising printing the captured area using a printing service of the multifunction device.

15. The method of claim 9, further comprising faxing the captured area using a faxing service of the multifunction device.

16. The method of claim 9, further comprising e-mailing the captured area using an e-mailing service of the multifunction device.

17. The method of claim 9, wherein capturing the area of the preview image within the selection box includes re-scanning only the area within the selection box.

* * * * *